United States Patent [19]
Nichols

[11] 3,935,557
[45] Jan. 27, 1976

[54] GROUND POSITION INDICATOR SYSTEM

[76] Inventor: Dewey F. Nichols, Box 106, Hosston, La. 71043

[22] Filed: Mar. 22, 1974

[21] Appl. No.: 453,675

[52] U.S. Cl. .............. 340/25; 244/77 R; 343/225
[51] Int. Cl.² .......................................... G08G 5/00
[58] Field of Search .............. 340/25, 23, 32, 225; 244/77 R, 77 B, 77 C, 114 R, 136; 343/225–228; 315/323

[56] References Cited
UNITED STATES PATENTS

| | | | |
|---|---|---|---|
| 2,736,991 | 3/1956 | Schumacher et al. | 244/136 |
| 2,941,753 | 6/1960 | Ripper | 244/77 C |
| 3,117,299 | 1/1964 | Lemm et al. | 343/225 |
| 3,121,857 | 2/1964 | Lemm et al. | 343/225 |
| 3,122,721 | 2/1964 | Liu et al. | 343/225 |

Primary Examiner—Marshall M. Curtis
Attorney, Agent, or Firm—John M. Harrison

[57] ABSTRACT

A ground position indicator system for crop dusting and other operations requiring air-to-ground coordination which includes a transmitter located within an aircraft, or on the ground, a receiver positioned on the ground and fitted with an antenna for receiving signals from the transmitter, and a series of lights or other visual aids located on the ground in cooperation with the receiver. The lights or other visual aids are capable of being sequentially activated by the pilot in the aircraft or by an operator on the ground, and used to selectively locate specific areas on the ground which must be dusted, treated or otherwise located by the aircraft. The system permits sequential passes by the aircraft over selected portions of the ground upon which the lights or other visual aids are located in the crop dusting or alternative coordinating operation.

6 Claims, 2 Drawing Figures

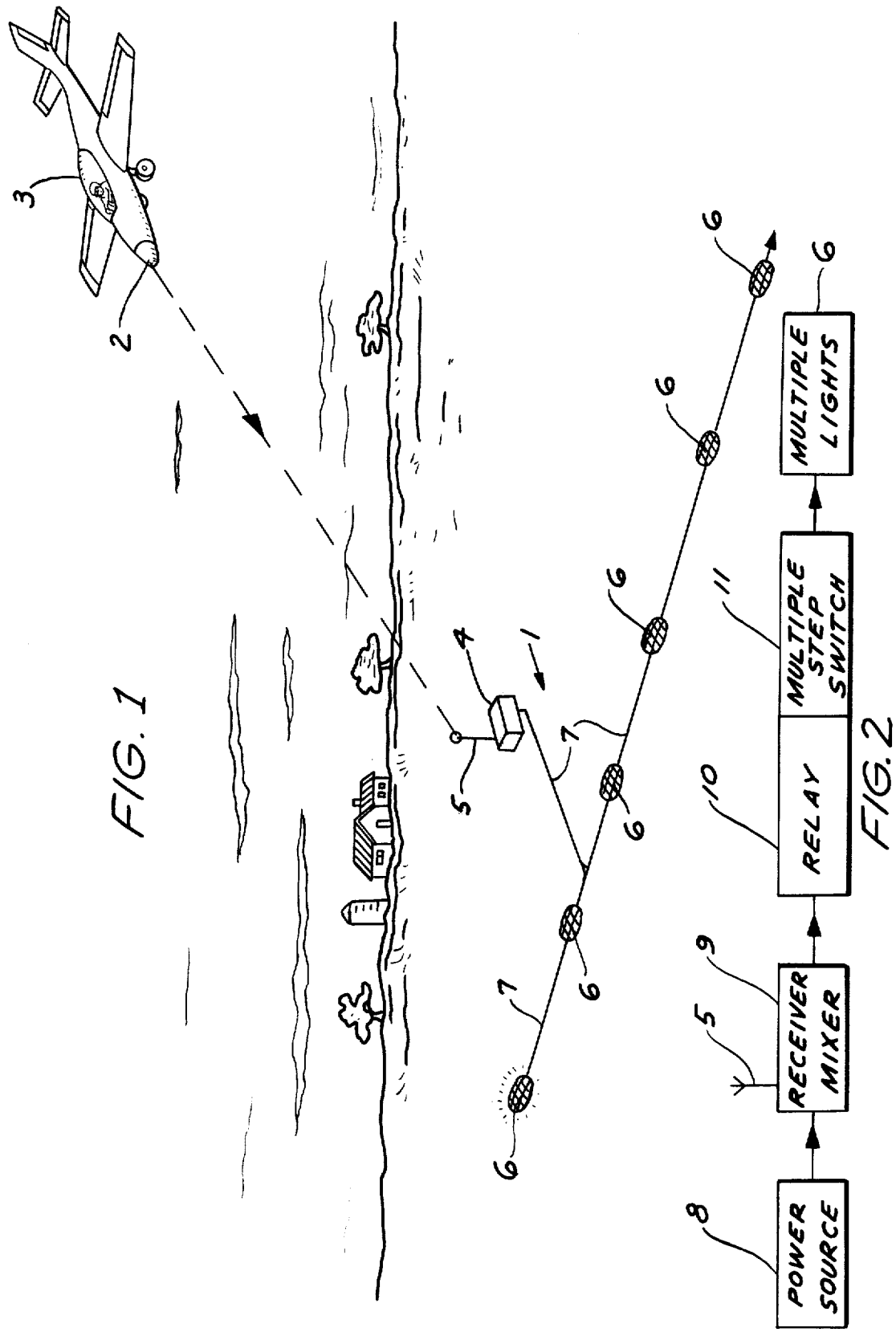

GROUND POSITION INDICATOR SYSTEM

CROSS REFERENCES TO RELATED APPLICATIONS

Aircraft initiated control systems for activating ground located visual aid devices known in the art have taken the form of apparatus for aircraft control of airport landing lights, as described in U.S. Pat. No. 3,121,857 to Lester F. Lemm and Harry W. Beeson. This patent covers a radio system for selectively activating lights on landing fields by aircraft.

Systems for regulating specific areas of ground covered in air-to-ground operations by aircraft, such as crop dusting, are typified by the system disclosed on Page 4, Volume 2, No. 12, January, 1974 issue of *The Transland Spread*, a company newspaper published by Transland, Inc., of 24511 Trampton Avenue, Harbor City, California. This system utilizes a radio controlled flag locator which is selectively positioned in a field to be treated, by means of a winch apparatus.

BACKGROUND OF THE INVENTION

1. Field of the Invention

This invention relates to a new and improved system for coordinating aircraft and selective areas on the ground, and more particularly, to a radio control system utilizing selectively and sequentially activated lights or other visual aids to control crop dusting operations. In a preferred embodiment of the invention, a radio transmitter is placed in an aircraft adapted for crop dusting, and a receiver equipped with an antenna is located on the ground with a series of lights or other visual aids located in selected positions in the field or area to be treated. The aircraft then makes a series of passes over the lights or alternative visual aids, and with each pass, causes one of the lights or visual aids to be activated by means of the transmitter, thereby precisely positioning the aircraft with respect to selected areas of the field.

2. Description of the Prior Art

Heretofore, air-to-ground operations such as crop dusting and simulated bombing or strafing runs have been achieved principally by means of flagging operations whereby the aircraft is guided in its passes over the field by a person standing in the field and signaling the desired path of flight with flags. Alternatively, visual aids such as signs are sometimes placed in strategic locations in the field to guide the pilot in successive passes over the field. In the case of crop dusting, the use of a flagman is a potentially hazardous operation since many of the chemicals utilized in the dusting operation are harmful to human beings and the aircraft must fly directly over the flagman at very low altitudes. Accordingly, the flagman must be clothed with a hood and protective clothing in order to minimize the amount of spray or poison which contacts the skin and must always be alert, since he is constantly in the flight path of the aircraft. Even under ideal circumstances where the flagman is properly clothed, periodic blood tests must be run in order to ascertain the level of toxic chemicals which the body has ingested as a result of the crop dusting operation, and the individual must be periodically removed from contact with the chemicals to insure his safety.

In the case of fixed signs of visual aids which guide the pilot on successive passes over the field, such signs are frequently difficult to read, and where large fields must be treated, it is frequently difficult to ascertain which sign was used by the pilot as the previous reference point in the dusting operation. This difficulty frequently results in excessive dusting of certain areas of the field and little or no dusting of other areas. Furthermore, the pilot's concentration on such a visual aid may cause him to lose control of the aircraft in a turn or other maneuver, thereby presenting a hazard to both pilot and aircraft.

Accordingly, an object of this invention is to provide an improved system for use in crop dusting and other air-to-ground operations where visual reference is necessary for coordination between an aircraft and specified areas of the ground, which system automatically guides the pilot through sequential passes over such specified areas.

Another object of this invention is to provide an improved crop dusting operation which permits uniform air-to-ground treatment of the field in question, including the dissemination of seeds and powdered and liquid chemicals.

Yet another object of this invention is to provide an improved system for guiding an aircraft over specified areas of a field in crop dusting operations, which includes the use of selectively energized lights or other visual aids activated by the aircraft in successive passes over the field.

A still further object of the invention is to provide an improved ground position indicator system for effecting uniform air-to-ground treatment of crops in crop dusting operations which includes activation of visual aids located on the ground to guide an aircraft in successive passes over the crops, which activation is initiated by a transmitter located in the aircraft or in a location on the ground at a safe distance from the field.

A still further object of the invention is to provide a ground position indicator system which is capable of being activated from an aircraft to selectively treat a field of crops from the air by effecting sequential and selective activation of a series of lights positioned in the field at selected intervals, thereby enabling the pilot to uniformly treat the field.

Yet another object of the invention is to provide a ground position indicator system for crop dusting which utilizes a portable visual aid arrangement capable of being located in substantially any area of a field for guiding an aircraft.

SUMMARY OF THE INVENTION

These and other objects of the invention are provided in a ground position indicator system for coordinating air-to-ground operations such as crop dusting, which, in a preferred embodiment, includes the following:

1. A transmitter located in an aircraft or in the alternative, on the ground;
2. A receiver located on the ground and equipped with an antenna for receiving signals from the transmitter;
and
3. A system of lights or other visual aids in electrical cooperation with the receiver and adapted to be selectively and sequentially energized to guide the pilot in a uniform manner over the lights.

BRIEF DESCRIPTION OF THE DRAWINGS

The invention will be better understood in view of the following description presented with reference to the accompanying drawings.

FIG. 1 of the drawing is a perspective view illustrating an aircraft approaching a preferred ground position indicator system of the instant invention, the latter of which is positioned in a field to be treated by the aircraft; and FIG. 2 is a block diagram generally showing the elements of the ground position indicator system which is preferably activated by the transmitter in the aircraft.

DESCRIPTION OF THE PREFERRED EMBODIMENTS

Referring now to FIGS. 1 and 2 of the drawing, ground position indicator system 1 is illustrated, consisting of transmitter 2, located in aircraft 3. Receiver 4, in cooperation with antenna 5, is adapted to receive transmissions from transmitter 2 to selectively and sequentially energize lights 6, which are positioned in cooperation with receiver 4 by means of electrical conduits 7. As illustrated in FIG. 2 of the drawing, power source 8, which is preferably a direct current source for ease of mobility, is located in the field for energizing receiver 4.

Referring to FIGS. 1 and 2 of the drawing, in operation of the ground position indicator system, an initial signal is transmitted by transmitter 2 as aircraft 3 approaches the field to be treated. The signal is received by antenna 5 and interpreted by receiver mixer 9, which in turn activates a specified relay 10. Relay 10 then activates a multiple step switch 11 which causes a selected light 6, to be illuminated. The first light to be illuminated by the initial transmission is generally a light located on an extreme end of the string of lights, since the treating operation normally begins at one edge of the field and proceeds to the other with successive passes of the aircraft. Aircraft 3 then continues its approach, and treats that area of the field located by the first light which is illuminated. On the return approach, the pilot again activates transmitter 2, which transmission is again received by antenna 5, relayed to receiver mixer 9, relay 10, and multiple step switch 11, respectively, the latter of which in turn automatically activates the second light in the series, causing it to illuminate. The pilot then aligns the aircraft with this light in his controlled pass, and treats that area of the field designated by the second light. This procedure is repeated with the pilot selectively activating the sequence of lights through successive passes across the field, until the entire field is treated in a uniform manner.

It will be appreciated that the series of lights or other visual aids may be portable, and therefore capable of being positioned in various areas of the field to be treated. Furthermore, the pilot is at liberty to begin his first pass at either end of the light string by simply activating his transmitter sequentially until the desired light or other visual aid is activated. Such flexibility in the system allows the pilot to either position the lights or selectively begin dusting so as to compensate for wind conditions and remain out of the area of lingering dust or spray from the preceding pass.

While the marking lights in the system may be placed as far apart as desired, it is preferred to locate the lights about fifty feet apart under circumstances where the ordinary, small, crop dusting aircraft is used in the treating operation. Furthermore, a direct current source may be permanently located in the field, or in the alternative, if alternating current is available, a converter can be utilized to supply direct current to the indicator system, since direct current power is preferred. The electrical conduits can be installed permanently underground and the receiver and related equipment in a suitable enclosure, if desired. In the alternative, the system can be entirely portable, as noted above, and can be transported from field to field as desired, in a truck or car, for use in different locations.

Under circumstances where the crops to be treated are located in a single field or several fields within a reasonably close proximity, a central transmitter station can be installed for activation of several position indicator systems in the field or fields; in the alternative, and under preferred conditions, the transmitter can be installed in the aircraft as heretofore noted.

While it is preferred to use white lights in the system to indicate successive areas of terrain to be treated, colored lights can be placed in the apparatus at predetermined points to indicate acreage covered by the aircraft, in order that the pilot may determine the rate of chemical use per area of the field covered. This procedure allows more efficient use of chemical treatment per acre of crop to be treated, and keeps reloading trips to the aircraft base at a minimum.

It will be appreciated by those skilled in the art that the aircraft transmitter utilized in this invention may be equipped with a single crystal or a number of crystals and an appropriate selector switch in order to activate the receiver system. If desired, a tone control may also be used with the crystal or combination of crystals in the transmitter to eliminate or at least minimize outside interference signals. The receiver may also be equipped with a sensitivity input signal control which may be adjusted to eliminate activation of the lights or other visual aids by stray external signals.

In operation, the receiver is turned to a particular pre-selected fixed frequency for a specific apparatus in a given field, which frequency is preferably 27 mc. Frequencies may be adjusted from band 1 to about band 23 within this 27 mc range for operating the various systems by substituting crystals in the respective receivers. Accordingly, the aircraft pilot may activate any given light in a specified indicator system by setting his selector switch to a predetermined transmission frequency band, preferably within the 27 mc range, and pressing a transmitter activator button without the necessity of voice communication. While the 27 mc or "citizens band" frequency is preferred for use in this invention, other frequencies which may be assigned by the FCC may be used as desired.

It will be appreciated by those skilled in the art that many variations in the inventive concept are possible. For example, the transmitter might be located on the ground at a point sufficiently distant from the receiver to eliminate or at least minimize the hazard of the chemical being sprayed, and the lights activated by a person at this point rather then by the pilot in the airplane, as heretofore discussed. Furthermore, mechanically activated flags or other visual aids can be used, if desired, in place of the sequence of lights as illustrated in FIG. 1 of the drawing, and the system can be portable or permanently installed, as desired. Other modifications of the inventive concept will be apparent to those skilled in the art, and consequently, the invention is to be limited only by the appended claims. Accordingly,

What is claimed is:

1. A ground position indicator system for air-to-ground coordination of an aircraft comprising:
   a. A transmitter;
   b. An antenna for receiving signals from said transmitter;
   c. A ground located receiver carrying said antenna and adapted to interpret and execute said signals; and
   d. A ground located system of lights in cooperation with said receiver and each selectively energized and sequentially activated by said signals to selectively guide said aircraft over said lights.

2. The ground position indicator system of claim 1 wherein said transmitter is located in said aircraft.

3. The ground position indicator system of claim 1 wherein said transmitter is located on the ground.

4. The ground position indicator system of claim 1 wherein said lights are a first set of white lights for marking the paths of said aircraft and a second set of colored lights positioned for indicating acreage covered by said aircraft in said air-to-ground coordination.

5. The ground position indicator system of claim 4 wherein said transmitter is located in said aircraft.

6. The ground position indicator system of claim 5 wherein:
   a. Said transmitter is located in said aircraft; and
   b. Said lights are a first set of white lights for marking the paths of said aircraft and a second set of colored lights positioned for indicating acreage covered by said aircraft in said air-to-ground coordination.

\* \* \* \* \*